US012049604B2

(12) United States Patent
Braeckman et al.

(10) Patent No.: US 12,049,604 B2
(45) Date of Patent: Jul. 30, 2024

(54) CLEANING COMPOSITION

(71) Applicant: The Procter & Gamble Company, Cincinnati, OH (US)

(72) Inventors: Karl Ghislain Braeckman, Gerpinnes (BE); Patrick Firmin August Delplancke, Steenhuize-Wijnhuize (BE); Nuray Yaldizkaya, Ghent (BE)

(73) Assignee: The Procter & Gamble Company, Cincinnati, OH (US)

(*) Notice: Subject to any disclaimer, the term of this patent is extended or adjusted under 35 U.S.C. 154(b) by 0 days.

(21) Appl. No.: 17/987,037

(22) Filed: Nov. 15, 2022

(65) Prior Publication Data

US 2023/0250363 A1 Aug. 10, 2023

Related U.S. Application Data

(63) Continuation of application No. 16/716,643, filed on Dec. 17, 2019, now Pat. No. 11,530,371, which is a continuation of application No. PCT/US2018/040174, filed on Jun. 29, 2018.

(30) Foreign Application Priority Data

Jun. 29, 2017 (EP) .................................... 17178830
Jan. 30, 2018 (EP) .................................... 18154011

(51) Int. Cl.

| | |
|---|---|
| ***C11D 1/29*** | (2006.01) |
| ***B08B 3/08*** | (2006.01) |
| ***C11D 1/14*** | (2006.01) |
| ***C11D 1/66*** | (2006.01) |
| ***C11D 1/72*** | (2006.01) |
| ***C11D 1/90*** | (2006.01) |
| ***C11D 1/94*** | (2006.01) |
| ***C11D 3/20*** | (2006.01) |
| ***C11D 3/30*** | (2006.01) |
| ***C11D 3/37*** | (2006.01) |
| ***C11D 3/43*** | (2006.01) |
| ***C11D 17/00*** | (2006.01) |
| *C11D 1/75* | (2006.01) |

(52) U.S. Cl.

CPC .................. *C11D 1/94* (2013.01); *B08B 3/08* (2013.01); *C11D 1/14* (2013.01); *C11D 1/72* (2013.01); *C11D 3/2003* (2013.01); *C11D 3/30* (2013.01); *C11D 3/3723* (2013.01); *C11D 3/43* (2013.01); *C11D 17/0008* (2013.01); *C11D 1/29* (2013.01); *C11D 1/662* (2013.01); *C11D 1/75* (2013.01); *C11D 1/90* (2013.01); *C11D 2111/14* (2024.01)

(58) Field of Classification Search

CPC .. C11D 1/14; C11D 1/29; C11D 1/662; C11D 1/72; C11D 1/75; C11D 3/30; C11D 3/3723; C11D 3/43; C11D 3/2003

USPC ....... 510/235, 237, 423, 424, 432, 433, 499, 510/505, 506

See application file for complete search history.

(56) References Cited

U.S. PATENT DOCUMENTS

| | | | | |
|---|---|---|---|---|
| 6,509,306 | B1 | 1/2003 | Wisniewski | |
| 11,072,763 | B2 | 7/2021 | Braeckman et al. | |
| 11,518,958 | B2 | 12/2022 | Tajmamet et al. | |
| 11,530,371 | B2 * | 12/2022 | Braeckman | C11D 17/049 |
| 2004/0053804 | A1 | 3/2004 | Yomogida | |
| 2005/0049160 | A1 | 3/2005 | Szewczyk | |
| 2009/0036345 | A1 | 2/2009 | Kulbick | |
| 2010/0197554 | A1 | 8/2010 | Koyuncu | |
| 2012/0225802 | A1 | 9/2012 | Perez-prat | |
| 2013/0303425 | A1 | 11/2013 | Scialla | |
| 2014/0206592 | A1 | 7/2014 | Keuleers | |
| 2020/0123469 | A1 | 4/2020 | Braeckman | |

FOREIGN PATENT DOCUMENTS

| | | | |
|---|---|---|---|
| DE | 19534269 | A1 | 3/1997 |
| DE | 19813042 | A1 | 9/1999 |
| EP | 2216391 | A1 | 8/2010 |
| EP | 2264138 | B1 | 3/2013 |
| EP | 2391699 | B1 | 6/2014 |
| JP | 2000248293 | A | 9/2000 |
| JP | 2002194388 | A | 7/2002 |
| JP | 2005053971 | A | 3/2005 |
| WO | 9700930 | A1 | 1/1997 |
| WO | 9929815 | A1 | 6/1999 |

(Continued)

OTHER PUBLICATIONS

All Office Actions; U.S. Appl. No. 16/716,633, filed Dec. 17, 2019.
All Office Actions; U.S. Appl. No. 16/716,643, filed Dec. 17, 2019.
Amphoteric Surfactants—XP55714793A, Retrieved from Internet: URL: https://www.chemicalbook.com/ProductCatalog_EN/1813.htm, Retrieved on Jul. 14, 2020, 2 pages.
BASF: Glucopon 600 CSUP—XP055451381, Apr. 4, 2013. Retrieved from Internet: URL: https://biakhim.com.ua/index.php?option=com k2&Itemid=1174&id=186_1fe38c5ffff0021a365b97b4125b033&lang=ru task=download view=item, Retrieved on Feb. 15, 2018, 4 Pages.
Extended EP Report and Written Opinion for 17178830.0 dated Nov. 6, 2017, 9 pages.

(Continued)

*Primary Examiner* — Gregory R Delcotto
(74) *Attorney, Agent, or Firm* — Carolyn S. Powell

(57) ABSTRACT

The present invention relates to a hand dishwashing cleaning composition including a desirable foam rheology profile. In particular, the composition includes a surfactant system comprising an alkyl polyglucoside surfactant having a mixture of: (a) 60% or more of a first alkyl polyglucoside surfactant material having an average carbon chain length between 10 and 12; and (b) 40% or less of a second alkyl polyglucoside surfactant material having an average alkyl carbon chain length between 12 and 16. Such compositions exhibit surprising and unexpected good sudsing profile, preferably suitable suds rheology and aesthetics, especially when applied onto a cleaning implement upon dilution with wash water during the dishwashing process.

15 Claims, No Drawings

(56) References Cited

FOREIGN PATENT DOCUMENTS

WO 2007135645 A2 11/2007

OTHER PUBLICATIONS

EP Search Report and Written Opinion for 18154011.3 dated Mar. 2, 2018, 12 pages.
PCT Search Report and Written Opinion for PCT/US2018/040174 dated Aug. 9, 2018, 14 pages.
Cognis: Glucopon 600 CS UP—XP055451377, Jan. 26, 2004. Retrieved from Internet: URL: http://www.bsibusiness.com/uploads/product/pdf/285 pdf.pdf, Retrieved on Feb. 15, 2018, 3 Pages.

* cited by examiner

CLEANING COMPOSITION

FIELD OF THE INVENTION

The present invention relates to a hand dishwashing cleaning composition. In particular, the composition has an improved and sustained foam rheology and foam aesthetics profile throughout dilution in a cleaning implement. A method of manually washing dishware is also provided.

BACKGROUND OF THE INVENTION

Manual/hand dishwashing is typically performed by applying dishwashing detergent to a cleaning implement (e.g., sponge) and scrubbing dishware with the cleaning implement. Accordingly, with this “direct application” method of hand dishwashing, the user usually relies on the sudsing profile as an indicator of the composition’s cleaning ability.

To qualify a dishwashing detergent as having a good sudsing profile, the generated foam must possess desirable suds aesthetics. For example, a detergent with a generated foam that tends to be very airy and watery is perceived by the user as being too dilute and the detergent as low performing. Alternatively, a detergent with a generated foam that is very dense and/or sticky is perceived by the user as being more of a care product (i.e., skin care, cosmetic, etc.) and the detergent as low performing. Therefore, the desirable foam would constitute airy bubbles that seem to travel very quickly from the cleaning implement to the items to be cleaned. Additionally, the appearance of the foam must not be too creamy nor too watery. Such a detergent would therefore be perceived by the user as being high performing.

Another aspect of good sudsing profile is that the detergent will foam as soon as manual pressure is applied with or on the cleaning implement. The resultant rapid suds formation can be referred to as “flash suds”. The presence of flash suds is viewed by the user as a signal that sufficient amounts of the detergent has been added. The lack of flash suds may compel the user to add additional detergent even though a sufficient amount has been added, thereby negatively impacting consumer perception of product value for money spent. The lack of flash suds may also result in overdosing of the product, thereby negatively impacting the environment, for example, by requiring higher amounts of water for rinsing the cleaning implement at the end of the washing process.

Yet another aspect of good sudsing profile is that the detergent performs well not only during the initial phase but for a substantial portion of, if not the entire, manual dishwashing process. For example, if the suds subside or if the foam changes appearance throughout use, then the user will assume that insufficient amounts of the actives (e.g., surfactants) are still present to effectively clean soiled dishware. Indeed, as the neat product during use becomes more diluted with wash water in the sponge, the resulting foam tends to become more airy and diluted in performance. As a result, the user will re-dose the detergent more frequently, which will result in the user’s dissatisfaction with the performance of the product.

Thus, the need remains for a cleaning composition having a good sudsing profile, in particular, the generated foam of the composition must possess desirable suds aesthetics in order to connote high performance benefits of the cleaning composition. It is desirable that the generated foam has a foam rheology and foam aesthetics characterized by suds that are not too creamy nor too airy and/or are not too watery, and that the foam rheology and foam aesthetics are sustained upon dilution with wash water throughout use. The need also exists for a cleaning composition, particularly a hand dishwashing cleaning composition, that provides good cleaning, particularly good cleaning of soils and/or grease removal. The Applicant has discovered that some or all of the above-mentioned needs can be at least partially fulfilled through cleaning compositions as is described herein below.

SUMMARY OF THE INVENTION

The present invention meets one or more of these needs based on the surprising discovery that by formulating a cleaning composition having a certain ratio of alkyl polyglucoside surfactants, such a composition has unique foam rheology profile that exhibits good sudsing profile, particularly desirable and sustained suds rheology and aesthetics throughout use, and/or cleaning performance benefits.

In one aspect, the present invention is directed to a hand dishwashing cleaning composition comprising:

a) from about 5% to about 50%, preferably from about 8% to about 45%, more preferably from about 15% to about 40% by weight of the total composition of a surfactant system comprising:
   (i) from about 1% to about 20%, preferably from about 2% to about 15%, more preferably from about 3% to about 10%, by weight of the surfactant system of an alkyl polyglucoside surfactant, wherein the alkyl polyglucoside surfactant comprises a mixture of: (a) about 60% or more, preferably about 70% or more, more preferably about 80% or more, even more preferably about 90% or more by weight of the total alkyl polyglucoside surfactant of a first alkyl polyglucoside surfactant having an average alkyl carbon chain length between 10 and 12, preferably between 10.1 and 11.9; and (b) about 40% or less, preferably about 30% or less, more preferably about 20% or less, even more preferably about 10% or less by weight of the total alkyl polyglucoside surfactant of a second alkyl polyglucoside surfactant having an average alkyl carbon chain length between 12 and 16, preferably between 12 and 14, more preferably between 12.1 and 13.9;
   (ii) from about 5% to about 40%, preferably from about 10% to about 35%, more preferably from about 15% to about 30%, by weight of the surfactant system of one or more amphoteric surfactant, zwitterionic surfactant, or mixtures thereof; preferably amphoteric surfactant or a mixture thereof; and
   (iii) from about 50% to about 85%, preferably from about 55% to about 80%, more preferably from about 60% to about 75%, by weight of the surfactant system of an anionic surfactant or mixtures thereof; and
b) from about 50% to about 85%, even more preferably from about 50% to about 75% by weight of the total composition of water.

Another aspect of the invention is a method of manually washing dishware comprising the steps of:

i) delivering a composition according to the invention onto soiled dishware or a cleaning implement; preferably a cleaning implement, more preferably a sponge;
ii) cleaning the dishware with the composition in the presence of water; and
iii) optionally, rinsing the dishware.

Another aspect of the invention provides for a use of a hand dishwashing cleaning composition according to the invention for the generation of flash suds in a hand dishwashing process and/or for providing stable suds, preferably wherein the composition provides the stable suds as having a static yield stress between 9 Pa and 12 Pa at from about 10% down to about 0.5% product concentration in demineralized water and 20° C., as measured using the method described herein.

It is an object of the composition of the present invention to exhibit good sudsing profile, preferably suitable suds rheology and aesthetics of the generated foam.

It is an object of the composition of the present invention to exhibit good sudsing profile, preferably flash suds generation.

It is an object of the composition of the present invention to exhibit good sudsing profile, preferably stable suds during a substantial portion of or for the entire manual dishwashing process.

It is an object of the composition to provide good cleaning, preferably good tough food cleaning (e.g., cooked-, baked- and burnt-on soils) and/or good grease cleaning.

These and other features, aspects and advantages of the present invention will become evident to those skilled in the art from the detailed description which follows.

DETAILED DESCRIPTION OF THE INVENTION

Definitions

As used herein, articles such as "a" and "an" when used in a claim, are understood to mean one or more of what is claimed or described.

The term "comprising" as used herein means that steps and ingredients other than those specifically mentioned can be added. This term encompasses the terms "consisting of" and "consisting essentially of." The compositions of the present invention can comprise, consist of, and consist essentially of the essential elements and limitations of the invention described herein, as well as any of the additional or optional ingredients, components, steps, or limitations described herein.

The term "foam rheology profile" as used herein means the ability of a foam to persist against changing shape upon application of shear force, and can be characterized per the test method measuring yield stress described herein.

The term "static yield stress" as used herein represents a physical foam characteristic indicative for foam aesthetics. For example, foams having a higher yield stress value have a more dense, creamy appearance contrary to foams with a lower yield stress which have a less dense, more watery and airy appearance.

The term "delta (A) yield stress" as used herein represents a physical measure indicative for the degree of change in foam appearance upon dilution with water. For example, smaller delta (A) yield stress values represent foams having a substantially consistent foam aesthetics upon dilution with water, while foams having higher delta (A) yield stress values are substantially less consistent upon dilution with water and become less dense and more airy/watery. The delta (A) yield stress is determined according to the method described herein.

The term "dishware" as used herein includes cookware and tableware made from, by non-limiting examples, ceramic, china, metal, glass, plastic (e.g., polyethylene, polypropylene, polystyrene, etc.) and wood.

The term "flash suds" as used herein means the initial suds generated upon dissolving of the cleaning composition on the dishware or the cleaning implement, especially the cleaning implement, during the initial stages of the dishwashing process.

The term "grease" as used herein means materials comprising at least in part (i.e., at least 0.5 wt % by weight of the grease) saturated and unsaturated fats and oils, preferably oils and fats derived from animal sources such as beef, pig and/or chicken.

The terms "include", "includes" and "including" are meant to be non-limiting.

The term "sudsing profile" as used herein refers to the properties of a cleaning composition relating to suds character during the dishwashing process, especially upon agitating a cleaning implement, especially a sponge, comprising said cleaning composition. The term "sudsing profile" of a cleaning composition includes suds volume generated upon dissolving and agitation, typically manual agitation, of the cleaning composition in the aqueous washing solution or in the cleaning implement, and the retention of the suds during the dishwashing process. Preferably, hand dishwashing cleaning compositions characterized as having "good sudsing profile" tend to have high flash suds volume and/or sustained suds volume, particularly during a substantial portion of or for the entire manual dishwashing process. This is important as the consumer uses high flash suds as an indicator that sufficient cleaning composition has been dosed. Moreover, the consumer also uses the sustained suds volume as an indicator that sufficient active cleaning ingredients (e.g., surfactants) are present, even towards the end of the dishwashing process. The consumer usually renews the washing solution when the sudsing subsides. Thus, a low sudsing cleaning composition will tend to be replaced by the consumer more frequently than is necessary because of the low sudsing level. The term "sudsing profile" of a cleaning composition may also include suds aesthetics.

It is understood that the test methods that are disclosed in the Test Methods Section of the present application must be used to determine the respective values of the parameters of Applicants' inventions as described and claimed herein.

In all embodiments of the present invention, all percentages are by weight of the total composition, as evident by the context, unless specifically stated otherwise. All ratios are weight ratios, unless specifically stated otherwise, and all measurements are made at 25° C., unless otherwise designated.

Cleaning Composition

The Applicants have surprisingly discovered that the cleaning compositions of the present invention exhibit a desired foam rheology profile characterized by good sudsing profile, particularly desirable suds aesthetics that connote high performance benefits of the cleaning composition. The composition possesses desirable suds rheology and suds aesthetics, including bubbles that are not overly creamy nor airy and/or are not too watery, and are sustained throughout dilution with the wash water during a dishwashing process. This signals to the user that even at high dilutions sufficient product is still present to provide great cleaning, as such triggering less re-dosing and overconsumption of the product by the user.

Such properties of the product also renders it useful for different hand dishwashing habits such as direct application of product on a cleaning implement or under full sink condition with diluted product.

The solution has been to formulate a composition with higher fractions of alkyl polyglucoside (APG) surfactant material having an average alkyl carbon chain length between 10 and 12. This benefit is surprising as the desirable sudsing profile is not present when traditional alkyl polyglucoside surfactants (i.e., comprising high fractions of APG surfactant material having an average alkyl carbon chain length larger than C12, preferably between C12 and C14, more preferably between 12.1 and 13.9) are formulated. Without wishing to be bound by theory, it is believed that this specific alkyl chain length fraction of the APG provides the right size and hydrophobicity versus hydrophilicity balance to efficiently pack at the air water interface together is with the anionic and amphoteric/zwitterionic surfactant of the invention. As a result, enhanced suds aesthetics and/or suds stabilization, upon dilution with wash water during the dishwashing process, of the cleaning composition of the present invention can be obtained.

Specifically, in one aspect the present invention envisages a cleaning composition, preferably a hand dishwashing cleaning composition. The composition of the present invention provides good cleaning and good sudsing profile. Other advantages associated with the composition of the present invention include that the composition presents good stability due to the compatibility of the surfactant system with the remaining ingredients of the composition. The composition can also be aesthetically pleasant because the presence of the surfactant system does not alter the appearance of the composition, i.e., transparent, translucent, etc. The composition of the present invention can also provide good grease removal, in particular good uncooked grease removal, The composition is a hand dishwashing cleaning composition, preferably in liquid form. The composition contains from about 50% to about 85%, preferably from about 50% to about 75% by weight of the total composition of a liquid carrier in which the other essential and optional components are dissolved, dispersed or suspended. One preferred component of the liquid carrier is water.

The pH of the composition is preferably from about 6 to about 14, preferably from about 7 to about 12, or more preferably from about 7.5 to about 10, as measured at 25° C. and 10% aqueous concentration in distilled water. The pH of the composition can be adjusted using pH modifying ingredients known in the art.

The composition of the present invention can be Newtonian or non-Newtonian, preferably Newtonian. The composition has a viscosity of from about 10 mPa s to about 10,000 mPa s, preferably from about 100 mPa s to about 5,000 mPa s, more preferably from about 300 mPa s to about 2,000 mPa s, or most preferably from about 500 mPa s to about 1,500 mPa s, alternatively combinations thereof. Viscosity is measured with a Brookfield RVT viscometer using spindle 21 at 20 RPM at 25° C.

Preferably, the composition of the present invention can produce a foam upon dispensing and the dispensed foam has a static yield stress between about 9 Pa and about 12 Pa at a 10% product concentration in demineralized water and 20° C., as measured using the method described herein.

Preferably, the composition of the present invention can produce a foam upon dispensing and the dispensed foam has a delta yield stress between 0 Pa and about 2 Pa at a 10% product concentration versus a 1% product concentration in demineralized water and 20° C., as measured using the method described herein.

Surfactant System

The cleaning composition comprises from about 5% to about 50%, more preferably from about 8% to about 45%, most preferably from about 15% to about 40%, by weight of the total composition of a surfactant system.

The surfactant system of the composition of the present invention comprises an alkyl polyglucoside ("APG") surfactant. Preferably, the surfactant system for the cleaning composition of the present invention comprises from about 1% to about 20%, preferably from about 2% to 15%, more preferably from about 3% to about 10%, by weight of the surfactant system of an alkyl polyglucoside surfactant. The alkyl polyglucoside surfactant is a mixture of: (a) about 60% or more, preferably about 70% or more, more preferably about 80% or more, even more preferably about 90% or more by weight of the total alkyl polyglucoside surfactant of a first alkyl polyglucoside surfactant having an average alkyl carbon chain length between 10 and 12, preferably between 10.1 and 11.9; and (b) about 40% or less, preferably about 30% or less, more preferably about 20% or less, even more preferably about 10% or less by weight of the total alkyl polyglucoside surfactant of a second alkyl polyglucoside surfactant having an average alkyl carbon chain length between 12 and 16, preferably between 12 and 14, more preferably between 12.1 and 13.9. In other words, the composition has higher fractions of a first alkyl polyglucoside surfactant material having an average carbon chain length represented by m, wherein m is represented by the formula: 10<m>12. Correspondingly, the composition has lower fractions of a second alkyl polyglucoside surfactant having an average carbon chain length represented by n, wherein n is represented by the formula: 12<n>14.

The first and second alkyl polyglucoside surfactants are added to a premix for preparing the cleaning composition, or directly to the cleaning composition as two separate starting materials. For example the cleaning composition can be obtained by mixing Glucopon® GD70 and Glucopon® 600 CSUP APG surfactant materials from BASF into a premix or into the cleaning composition per the ratios described herein, Glucopon® GD70 comprising an APG with an average alkyl carbon chain length between 10 and 12, and Glucopon® 600CSUP comprising an APG with an average alkyl carbon chain length between 12 and 14. It will be understood that APG surfactant mixtures of the present invention comprise of at least two or more different APG surfactants and does not include an APG surfactant material having an average carbon chain length of 12 (i.e., a pure C12).

Preferably, the APG surfactant is an alkyl polyglucoside surfactant material having an average alkyl carbon chain length between 10 and 12, preferably between 10.1 and 11.9. Preferably, the APG surfactant comprises about 100% of the first alkyl polyglucoside surfactant having an average alkyl carbon chain length between 10 and 12, preferably between 10.1 and 11.9. The APG surfactant preferably has an average degree of polymerization of between about 0.1 and about 3, preferably between about 0.5 and about 2.5, more preferably between about 1 and about 2, and most preferably between about 1.2 and about 1.6.

Suitable alkyl polyglucoside surfactant material having an average alkyl carbon chain length between 10 and 12 is commercially available as Glucopon® GD70 from BASF. Suitable alkyl polyglucoside surfactant material having an average alkyl carbon chain length between 12 and 16, preferably between 12 and 14, more preferably between 12.1 and 13.9 is commercially available as Glucopon® 600 CSUP from BASF.

The surfactant system of the composition of the present invention comprises an anionic surfactant. Preferably, the surfactant system for the cleaning composition of the present invention comprises from about 50% to about 85%, preferably from about 55% to 80%, more preferably from about 60% to about 75%, by weight of the surfactant system of an anionic surfactant. The anionic surfactant can be any anionic cleaning surfactant, preferably selected from sulphate and/or sulfonate and/or sulfosuccinate anionic surfactants. Especially preferred anionic surfactant is selected from the group consisting of alkyl sulfate, alkyl alkoxy sulfate and mixtures thereof, and preferably wherein the alkyl alkoxy sulfate is an alkyl ethoxy sulfate. Preferred anionic surfactant is an alkyl ethoxy sulfate with a mol average ethoxylation degree of less than about 5, preferably less than about 3, more preferably less than about 2 and more than about 0.5.

Preferably the alkyl ethoxy sulfate anionic surfactant has a weight average level of branching of from about 5% to about 60%, preferably from about 10% to about 55%, more preferably from about 15% to about 50%, even more preferably from about 20% to about 45%, most preferably from about 25% to about 45%. This level of branching also contributes to better dissolution and suds lasting. It also contributes to the stability of the detergent at low temperature. Preferably the alkyl ethoxy sulfate anionic surfactant has a mol average alkyl carbon chain length between 10 and 14, preferably between 12 and 14. Most preferably the alkyl ethoxy sulfate anionic surfactant has a mol average alkyl carbon chain length between 12 and 14, a mol average degree of ethoxylation of less than about 2 and more than about 0.5 and a weight average level of branching between about 25 and about 45%. Detergents having this ratio present good dissolution and suds performance.

When the alkyl ethoxylated sulfate anionic surfactant is a mixture, the average alkoxylation is degree is the mol average alkoxylation degree of all the components of the mixture (i.e., mol average alkoxylation degree). In the mol average alkoxylation degree calculation the weight of sulfate anionic surfactant components not having alkoxylate groups should also be included.

$$Mol \text{ average alkoxylation degree}=(x1^*\text{alkoxylation degree of surfactant } 1+x2^*\text{alkoxylation degree of surfactant } 2+\ldots)/(x1+x2+\ldots)$$

wherein x1, x2, . . . are the number of moles of each sulfate anionic surfactant of the mixture and alkoxylation degree is the number of alkoxy groups in each sulfate anionic surfactant.

If the surfactant is branched, the preferred branching group is an alkyl. Typically, the alkyl is selected from methyl, ethyl, propyl, butyl, pentyl, cyclic alkyl groups and mixtures thereof. Single or multiple alkyl branches could be present on the main hydrocarbyl chain of the starting alcohol(s) used to produce the sulfate anionic surfactant used in the composition of the invention.

The branched sulfate anionic surfactant can be a single anionic surfactant or a mixture of anionic surfactants. In the case of a single surfactant the percentage of branching refers to the weight percentage of the hydrocarbyl chains that are branched in the original alcohol from which the surfactant is derived.

In the case of a surfactant mixture the percentage of branching is the weight average and it is defined according to the following formula:

$$\text{Weight average of branching }(\%)=[(x1^*\text{wt \% branched alcohol 1 in alcohol } 1+x2^*\text{wt \% branched alcohol 2 in alcohol } 2+\ldots)/(x1+x2+\ldots)]^*100$$

wherein x1, x2, are the weight in grams of each alcohol in the total alcohol mixture of the alcohols which were used as starting material for the anionic surfactant for the detergent of the invention. In the weight average branching degree calculation, the weight of anionic surfactant components not having branched groups should also be included.

Suitable counterions include alkali metal cation earth alkali metal cation, alkanolammonium or ammonium or substituted ammonium, but preferably sodium.

Suitable examples of commercially available sulfates include, those based on Neodol alcohols ex the Shell company, Lial—Isalchem and Safol® ex the Sasol company, natural alcohols ex The Procter & Gamble Chemicals company. Suitable sulfonate surfactants for use herein include water-soluble salts of C8-C18 alkyl or hydroxyalkyl sulfonates; C11-C18 alkyl benzene sulfonates (LAS), modified alkylbenzene sulfonate (MLAS); methyl ester sulfonate (MES); and alpha-olefin sulfonate (AOS). Those also include the paraffin sulfonates may be monosulfonates and/or disulfonates, obtained by sulfonating paraffins of 10 to 20 carbon atoms. The sulfonate surfactant also include the alkyl glyceryl sulfonate surfactants.

The surfactant system of the composition of the present invention comprises from about 5% to about 40%, preferably from about 10% to about 35%, more preferably from about 15% to about 30%, by weight of the surfactant system of one or more amphoteric surfactant, zwitterionic surfactant, or mixtures thereof, preferably an amphoteric surfactant.

Preferably, the amphoteric surfactant is an amine oxide surfactant selected from the group consisting of linear or branched alkyl amine oxide, linear or branched alkyl amidopropyl amine oxide, and mixtures thereof. More preferably, the amine oxide surfactant is linear C10 alkyl dimethyl amine oxide, linear C12-C14 alkyl dimethyl amine oxides and mixtures thereof. More preferably, the amine oxide surfactant is C12-C14 alkyl dimethyl amine oxide.

Preferably, the amine oxide surfactant is alkyl dimethyl amine oxide or alkyl amido propyl dimethyl amine oxide, preferably alkyl dimethyl amine oxide and especially coco dimethyl amino oxide, most preferably C12-C14 alkyl dimethyl amine oxide. Typical linear amine oxides include water-soluble amine oxides containing one R1 C8-18 alkyl moiety and 2 R2 and R3 moieties selected from the group consisting of C1-3 alkyl groups and C1-3 hydroxyalkyl groups. Preferably amine oxide is characterized by the formula R1—N(R2)(R3) O wherein R1 is a C8-18 alkyl and R2 and R3 are selected from the group consisting of methyl, ethyl, propyl, isopropyl, 2-hydroxethyl, 2-hydroxypropyl and 3-hydroxypropyl. The linear amine oxide surfactants in particular may include linear C10-C18 alkyl dimethyl amine oxides and linear C8-C12 alkoxy ethyl dihydroxy ethyl amine oxides. Preferred amine oxides include linear C10, linear C10-C12, and linear C12-C14 alkyl dimethyl amine oxides. As used herein "mid-branched" means that the amine oxide has one alkyl moiety having n1 carbon atoms with one alkyl branch on the alkyl moiety having n2 carbon atoms. The alkyl branch is located on the α carbon from the nitrogen on the alkyl moiety. This type of branching for the amine oxide is also known in the art as an internal amine oxide. The total sum of n1 and n2 is from 10 to 24 carbon atoms, preferably from 12 to 20, and more preferably from 10 to 16. The number of carbon atoms for the one alkyl moiety (n1) should be approximately the same number of carbon atoms as the one alkyl branch (n2) such that the one alkyl moiety and the one alkyl branch are symmetric. As used herein "symmetric" means that $|n1-n2|$ is less than or equal to 5, preferably 4, most preferably from 0 to 4 carbon atoms in at least about 50 wt %, more preferably at least about 75 wt % to about 100 wt % of the mid-branched amine oxides for use herein. The amine oxide further comprises two moieties, independently selected from a C1-3 alkyl, a C1-3 hydroxyalkyl group, or a polyethylene oxide group containing an average of from about 1 to about 3 ethylene oxide groups. Preferably, the two moieties are selected from a C1-3 alkyl, more preferably both are selected as a C1 alkyl.

Alternatively, the amine oxide surfactant is a mixture of amine oxides comprising a low-cut amine oxide and a mid-cut amine oxide. The amine oxide of the composition of the invention then comprises:

a) from about 10% to about 45% by weight of the amine oxide of low-cut amine oxide of formula R1R2R3AO wherein R1 and R2 are independently selected from hydrogen, C1-C4 alkyls or mixtures thereof, and R3 is selected from C10 alkyls or mixtures thereof; and
b) from about 55% to about 90% by weight of the amine oxide of mid-cut amine oxide of formula R4R5R6AO wherein R4 and R5 are independently selected from hydrogen, C1-C4 alkyls or mixtures thereof, and R6 is selected from C12-C16 alkyls or mixtures thereof.

In a preferred low-cut amine oxide for use herein R3 is n-decyl. In another preferred low-cut amine oxide for use herein R1 and R2 are both methyl. In an especially preferred low-cut amine oxide for use herein R1 and R2 are both methyl and R3 is n-decyl.

Preferably, the amine oxide comprises less than about 5%, more preferably less than about 3%, by weight of the amine oxide of an amine oxide of formula R7R8R9AO wherein R7 and R8 are selected from hydrogen, C1-C4 alkyls and mixtures thereof and wherein R9 is selected from C8 alkyls and mixtures thereof. Compositions comprising R7R8R9AO tend to be unstable and do not provide very suds mileage.

Preferably, the zwitterionic surfactant is a betaine surfactant. Suitable betaine surfactant includes alkyl betaines, alkylamidobetaine, amidazoliniumbetaine, sulfobetaine (INCI Sultaines) as well as the Phosphobetaine and preferably meets Formula (I):

$$R^1[CO—X(CH_2)_n]_x—N^+(R^2)(R_3)—(CH_2)_m—[CH(OH)—CH_2]_y—Y— \quad (I)$$

wherein

R1 is a saturated or unsaturated C6-22 alkyl residue, preferably C8-18 alkyl residue, in particular a saturated C10-16 alkyl residue, for example a saturated C12-14 alkyl residue;

X is NH, NR4 with C1-4 Alkyl residue R4, O or S, n a number from 1 to 10, preferably 2 to 5, in particular 3, x 0 or 1, preferably 1, R2, R3 are independently a C1-4 alkyl residue, potentially hydroxy substituted such as a hydroxyethyl, preferably a methyl.

m a number from 1 to 4, in particular 1, 2 or 3, y 0 or 1 and

Y is COO, S03, OPO(OR5)O or P(O)(OR5)O, whereby R5 is a hydrogen atom H or a C1-4 alkyl residue.

Preferred betaines are the alkyl betaines of the Formula (Ia), the alkyl amido propyl betaine of the Formula (Ib), the Sulfo betaines of the Formula (Ic) and the Amido sulfobetaine of the Formula (Id):

$$R^1—N(CH_3)_2CH_2COO— \quad (Ia)$$

$$R^1—CO—NH(CH_2)_3N^+(CH_3)_2—CH_2COO— \quad (Ib)$$

$$R^1—N^+(CH_3)_2—CH_2CH(OH)CH_2SO_3— \quad (Ic)$$

$$R^1—CO—NH—(CH_2)_3—N^+(CH_3)_2—CH_2CH(OH)CH_2SO_3— \quad (Id)$$

in which R1 as the same meaning as in Formula (I). Particularly preferred betaines are the Carbobetaine [wherein Y—=COO—], in particular the Carbobetaine of the Formulae (Ia) and (Ib), more preferred are the Alkylamidobetaine of the Formula (Ib).

Examples of suitable betaines and sulfobetaine are the following [designated in accordance with INCI]: Almondamidopropyl of betaines, Apricotam idopropyl betaines, Avocadamidopropyl of betaines, Babassuamidopropyl of betaines, Behenam idopropyl betaines, Behenyl of betaines, betaines, Canolam idopropyl betaines, Capryl/Capram idopropyl betaines, Carnitine, Cetyl of betaines, Cocamidoethyl of betaines, Cocam idopropyl betaines, Cocam idopropyl Hydroxysultaine, Coco betaines, Coco Hydroxysultaine, Coco/Oleam idopropyl betaines, Coco Sultaine, Decyl of betaines, Dihydroxyethyl Oleyl Glycinate, Dihydroxyethyl Soy Glycinate, Dihydroxyethyl Stearyl Glycinate, Dihydroxyethyl Tallow Glycinate, Dimethicone Propyl of PG-betaines, Erucam idopropyl Hydroxysultaine, Hydrogenated Tallow of betaines, Isostearam idopropyl betaines, Lauram idopropyl betaines, Lauryl of betaines, Lauryl Hydroxysultaine, Lauryl Sultaine, Milkam idopropyl betaines, Minkamidopropyl of betaines, Myristam idopropyl betaines, Myristyl of betaines, Oleam idopropyl betaines, Oleam idopropyl Hydroxysultaine, Oleyl of betaines, Olivamidopropyl of betaines, Palmam idopropyl betaines, Palm itam idopropyl betaines, Palmitoyl Camitine, Palm Kemelam idopropyl betaines, Polytetrafluoroethylene Acetoxypropyl of betaines, Ricinoleam idopropyl betaines, Sesam idopropyl betaines, Soyam idopropyl betaines, Stearam idopropyl betaines, Stearyl of betaines, Tallowam idopropyl betaines, Tallowam idopropyl Hydroxysultaine, Tallow of betaines, Tallow Dihydroxyethyl of betaines, Undecylenam idopropyl betaines and Wheat Germam idopropyl betaines.

A preferred betaine is, for example, cocoamidopropylbetaine.

Preferably, the surfactant system of the composition of the present invention comprises an anionic surfactant and an amine oxide surfactant, wherein the ratio of the anionic surfactant to the amine oxide surfactant is from about 1:1 to about 8:1, preferably from about 2:1 to about 5:1, even more preferably from about 2.5:1 to about 4:1.

Preferably, the surfactant system of the composition of the present invention comprises: (i) from about 60% to about 75% by weight of the surfactant system of an alkyl ethoxy sulfate; (ii) from about 15% to about 30% by weight of the surfactant system of an amine oxide surfactant; and (iii) from about 3% to about 10% by weight of the surfactant system of an alkyl polyglucoside surfactant having an average alkyl carbon chain length between 10 and 12, preferably having a degree of polymerization between 1.2 and 1.6.

Preferably, the surfactant system of the composition of the present invention further comprises from about 1% to about 25%, preferably from about 1.25% to about 20%, more preferably from about 1.5% to about 15%, most preferably from about 1.5% to about 5% by weight of the surfactant system, of a non-ionic surfactant. Preferably, the non-ionic surfactant is a linear or branched, primary or secondary alkyl alkoxylated non-ionic surfactant, preferably an alkyl ethoxylated non-ionic surfactant, preferably comprising on average from 9 to 15, preferably from 10 to 14 carbon atoms in its alkyl chain and on average from 5 to 12, preferably from 6 to 10, most preferably from 7 to 8, units of ethylene oxide per mole of alcohol.

Amphiphilic Polymer

The composition of the present invention may further comprise from about 0.01% to about 5%, preferably from about 0.05% to about 2%, more preferably from about 0.07% to about 1% by weight of the total composition of an amphiphilic polymer selected from the groups consisting of amphiphilic alkoxylated polyalkyleneimine, amphiphilic graft polymer and mixtures thereof, preferably an amphiphilic polyalkyleneimine.

Preferably, the amphiphilic alkoxylated polyalkyleneimine is an alkoxylated polyethyleneimine polymer comprising a polyethyleneimine backbone having average molecular weight range from 100 to 5,000, preferably from 400 to 2,000, more preferably from 400 to 1,000 Daltons and the alkoxylated polyethyleneimine polymer further comprising:

(i) one or two alkoxylation modifications per nitrogen atom by a polyalkoxylene chain having an average of about 1 to about 50 alkoxy moieties per modification, wherein the terminal alkoxy moiety of the alkoxylation modification is capped with hydrogen, a C1-C4 alkyl or mixtures thereof;

(ii) an addition of one C1-C4 alkyl moiety and one or two alkoxylation modifications per nitrogen atom by a polyalkoxylene chain having an average of about 1 to about 50 alkoxy moieties per modification wherein the terminal alkoxy moiety is capped with hydrogen, a C1-C4 alkyl or mixtures thereof; or (iii) a combination thereof; and wherein the alkoxy moieties comprises ethoxy (EO) and/or propxy (PO) and/or butoxy (BO) and wherein when the alkoxylation modification comprises EO it also comprises PO or BO.

Preferred amphiphilic alkoxylated polyethyleneimine polymers comprise EO and PO groups within their alkoxylation chains, the PO groups preferably being in terminal position of the alkoxy chains, and the alkoxylation chains preferably being hydrogen capped. Hydrophilic alkoxylated polyethyleneimine polymers solely comprising ethoxy (EO) units within the alkoxylation chain could also optionally be formulated within the scope of this invention.

For example, but not limited to, below is shown possible modifications to terminal nitrogen atoms in the polyethyleneimine backbone where R represents an ethylene spacer and E represents a C1-C4 alkyl moiety and X— represents a suitable water soluble counterion.

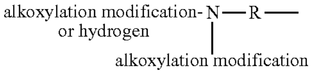

or

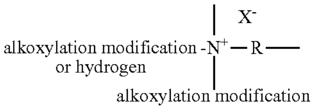

Also, for example, but not limited to, below is shown possible modifications to internal nitrogenatoms in the polyethyleneimine backbone where R represents an ethylene spacer and E represents a C1-C4 alkyl moiety and X— represents a suitable water soluble counterion.

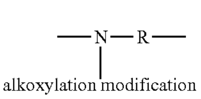

or

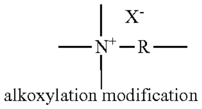

The alkoxylation modification of the polyethyleneimine backbone consists of the replacement of a hydrogen atom by a polyalkoxylene chain having an average of about 1 to about 50 alkoxy moieties, preferably from about 20 to about 45 alkoxy moieties, most preferably from about 30 to about 45 alkoxy moieties. The alkoxy moieties are selected from ethoxy (EO), propoxy (PO),butoxy (BO), and mixtures thereof. Alkoxy moieties solely comprising ethoxy units are outside the scope of the invention though. Preferably, the polyalkoxylene chain is selected from ethoxy/propoxy block moieties. More preferably, the polyalkoxylene chain is ethoxy/propoxy block moieties having an average degree of ethoxylation from about 3 to about 30 and an average degree of propoxylation from about 1 to about 20, more preferably ethoxy/propoxy block moieties having an average degree of ethoxylation from about 20 to about 30 and an average degree of propoxylation from about 10 to about 20.

More preferably the ethoxy/propoxy block moieties have a relative ethoxy to propoxy unit ratio between 3 to 1 and 1 to 1, preferably between 2 to 1 and 1 to 1. Most preferably the polyalkoxylene chain is the ethoxy/propoxy block moieties wherein the propoxy moiety block is the terminal alkoxy moiety block.

The modification may result in permanent quaternization of the polyethyleneimine backbone nitrogen atoms. The degree of permanent quaternization may be from 0% to about 30% of the polyethyleneimine backbone nitrogen atoms. It is preferred to have less than about 30% of the polyethyleneimine backbone nitrogen atoms permanently quaternized. Most preferably the degree of quaternization is about 0%.

A preferred polyethyleneimine has the general structure of Formula (II):

(II)

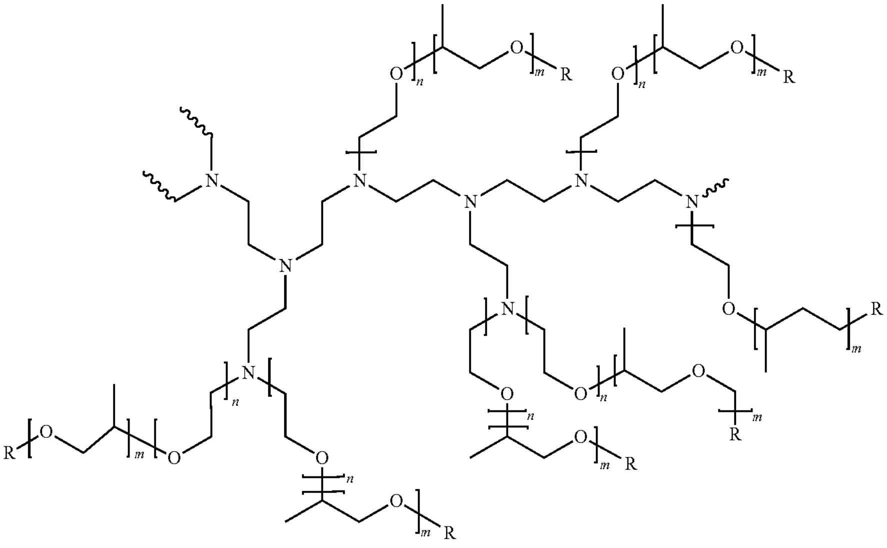

wherein the polyethyleneimine backbone has a weight average molecular weight of about 600, n of formula (II) has an average of about 10, m of formula (II) has an average of about 7 and R of formula (II) is selected from hydrogen, a C1-C4 alkyl and mixtures thereof, preferably hydrogen. The degree of permanent quaternization of formula (II) may be from 0% to about 22% of the polyethyleneimine backbone nitrogen atoms. The molecular weight of this polyethyleneimine preferably is between 10,000 and 15,000.

An alternative polyethyleneimine has the general structure of Formula (II) but wherein the polyethyleneimine backbone has a weight average molecular weight of about 600, n of Formula (II) has an average of about 24, m of Formula (II) has an average of about 16 and R of Formula (II) is selected from hydrogen, a C1-C4 alkyl and mixtures thereof, preferably hydrogen. The degree of permanent quaternization of Formula (II) may be from 0% to about 22% of the polyethyleneimine backbone nitrogen atoms. The molecular weight of this polyethyleneimine preferably is between about 25,000 and about 30,000.

Most preferred polyethyleneimine has the general structure of Formula (II) wherein the polyethyleneimine backbone has a weight average molecular weight of about 600, n of Formula (II) has an average of about 24, m of Formula (II) has an average of about 16 and R of Formula (II) is hydrogen. The degree of permanent quaternization of Formula (II) is 0% of the polyethyleneimine backbone nitrogen atoms. The molecular weight of this polyethyleneimine preferably is from about 25,000 to about 30,000, most preferably about 28,000.

These polyethyleneimines can be prepared, for example, by polymerizing ethyleneimine in the presence of a catalyst such as carbon dioxide, sodium bisulfite, sulfuric acid, hydrogen peroxide, hydrochloric acid, acetic acid, and the like, as described in more detail in PCT Publication No. WO 2007/135645.

Preferably, the amphiphilic graft polymer herein is a random graft copolymer having a hydrophilic backbone and hydrophobic side chains. Typically, the hydrophilic backbone is less than about 70%, less than about 50%, or from about 50% to about 2%, or from about 45% to about 5%, or from about 40% to about 10% by weight of the polymer. The backbone preferably contains monomers selected from the group consisting of unsaturated C3-6 acid, ether, alcohol, aldehyde, ketone or ester, sugar unit, alkoxy unit, maleic anhydride and saturated polyalcohol such as glycerol, and a mixture thereof. The hydrophilic backbone may contain acrylic acid, methacrylic acid, maleic acid, vinyl acetic acid, glucoside, alkylene oxide, glycerol, or a mixture thereof. The polymer may contain either a linear or branched polyalkylene oxide backbone with ethylene oxide, propylene oxide and/or butylene oxide. The polyalkylene oxide backbone may contain more than about 80%, or from about 80% to about 100%, or from about 90% to about 100% or from about 95% to about 100% by weight ethylene oxide. The weight average molecular weight (Mw) of the polyalkylene oxide backbone is typically from about 400 g/mol to 40,000 g/mol, or from about 1,000 g/mol to about 18,000 g/mol, or from about 3,000 g/mol to about 13,500 g/mol, or from is about 4,000 g/mol to about 9,000 g/mol. The polyalkylene backbone may be extended by condensation with suitable connecting molecules, such as dicarboxylic acids and/or diisocianates.

The backbone contains a plurality of hydrophobic side chains attached thereto, such as a C4-25 alkyl group; polypropylene; polybutylene; a vinyl ester of a saturated monocarboxylic C1-6 acid; and/or a C1-6 alkyl ester of acrylic or methacrylic acid. The hydrophobic side chains may contain, by weight of the hydrophobic side chains, at least about 50% vinyl acetate, or from about 50% to about 100% vinyl acetate, or from about 70% to about 100% vinyl acetate, or from about 90% to about 100% vinyl acetate. The hydrophobic side chains may contain, by weight of the hydrophobic side chains, from about 70% to about 99.9% vinyl acetate, or from about 90% to about 99% vinyl acetate. The hydrophobic side chains may also contain, by weight of the hydrophobic side chains, from about 0.1% to about 10% butyl acrylate, or from about 1% to about 7% butyl acrylate, or from about 2% to about 5% butyl acrylate. The hydrophobic side chains may also contain a modifying monomer, such as styrene, N-vinylpyrrolidone, acrylic acid, methacrylic acid, maleic acid, acrylamide, vinyl acetic acid and/or vinyl formamide, especially styrene and/or N-vinylpyrrolidone, at levels of from about 0.1% to about 10%, or from about 0.1% to about 5%, or from about 0.5% to about 6%, or from about 0.5% to about 4%, or from about 1% to about 3%, by weight of the hydrophobic side chains.

Preferred graft polymers for the present invention are amphiphilic graft polymers based on water-soluble polyalkylene oxides (A) as a graft base and side chains formed by polymerization of a vinyl ester component (B), said polymers having an average of three, preferably one graft site per 50 alkylene oxide units and mean molar masses Mw of from 3000 to 100 000.

A material within this definition, based on polyethylene oxide of molecular weight 6000 (equivalent to 136 ethylene oxide units), containing approximately 3 parts by weight of vinyl acetate units per 1 part by weight of polyethylene oxide, and having itself a molecular weight of 24 000, is commercially available from BASF as Sokalan® HP22.

The composition of the present invention may further comprise at least one active selected from the group consisting of: i) a salt, ii) a hydrotrope, iii) an organic solvent, and mixtures thereof.

Salt

The composition of the present invention may further comprise from about 0.05% to about 2%, preferably from about 0.2% to about 1.5%, or more preferably from about 0.5% to about 1%, by weight of the total composition of a salt, preferably a monovalent, divalent inorganic salt or a mixture thereof, more preferably sodium chloride, sodium sulphate or a mixture thereof, most preferably sodium chloride.

Hydrotrope

The composition of the present invention may further comprise from about 0.1% to about 10%, or preferably from about 0.5% to about 10%, or more preferably from about 1% to about 6% by weight of the total composition of a hydrotrope or a mixture thereof, preferably sodium cumene sulfonate.

Organic Solvent

The composition of the present invention may further comprise an organic solvent. Suitable organic solvents include C4-14 ethers and diethers, polyols, glycols, alkoxylated glycols, C6-C16 glycol ethers, alkoxylated aromatic alcohols, aromatic alcohols, aliphatic linear or branched alcohols, alkoxylated aliphatic linear or branched alcohols, alkoxylated C1-C5 alcohols, C8-C14 alkyl and cycloalkyl hydrocarbons and halohydrocarbons, and mixtures thereof. Preferably the organic solvents include alcohols, glycols, and glycol ethers, alternatively alcohols and glycols. The composition comprises from 0% to less than about 50%, preferably from about 0.01% to about 25%, more preferably from about 0.1% to about 10%, or most preferably from about 0.5% to about 5%, by weight of the total composition of an organic solvent, preferably an alcohol, more preferably ethanol, a polyalkyleneglycol, more preferably polypropyleneglycol, and mixtures thereof.

Adjunct Ingredients

The cleaning composition herein may optionally comprise a number of other adjunct ingredients such as builders (e.g., preferably citrate), chelants, conditioning polymers, cleaning polymers, surface modifying polymers, soil flocculating polymers, structurants, emollients, humectants, skin rejuvenating actives, enzymes, carboxylic acids, scrubbing particles, bleach and bleach activators, perfumes, malodor control agents, pigments, dyes, opacifiers, beads, pearlescent particles, microcapsules, inorganic cations such as alkaline earth metals such as Ca/Mg-ions, antibacterial agents, preservatives, viscosity adjusters (e.g., salt such as NaCl, and other mono-, di- and trivalent salts) and pH adjusters and buffering means (e.g. carboxylic acids such as citric acid, HCl, NaOH, KOH, alkanolamines, phosphoric and sulfonic acids, carbonates such as sodium carbonates, bicarbonates, sesquicarbonates, borates, silicates, phosphates, imidazole and alike).

The elements of the composition of the invention described in connexion with the first aspect of the invention apply mutatis mutandis to the other aspects of the invention.

Method of Washing

In another aspect, the invention is directed to a method of manually washing dishware with the composition of the present invention. The method comprises the steps of delivering a composition of the present invention onto the soiled dishware or a cleaning implement. The composition can be pre-dissolved in a sink of water to create an aqueous washing solution and the soiled dishware is immersed in the aqueous washing solution. The dishware can be cleaned with the composition in the presence of water. Optionally, the dishware can be rinsed. By "rinsing", it is meant herein contacting the dishware cleaned with the process according to the present invention with substantial quantities of appropriate solvent, typically water, after the step of applying the liquid composition herein onto said dishware. By "substantial quantities", it is meant usually about 1 to about 20 liters.

The composition herein can be applied in its diluted form. Soiled dishware are contacted with an effective amount, typically from about 0.5 mL to about 20 mL (per about 25 dishes being treated), preferably from about 3 mL to about 10 mL, of the cleaning composition, preferably in liquid form, of the present invention diluted in water. The actual amount of cleaning composition used will be based on the judgment of the user, and will typically depend upon factors such as the particular product formulation of the cleaning composition, including the concentration of active ingredients in the cleaning composition, the number of soiled dishes to be cleaned, the degree of soiling on the dishes, and the like. Generally, from about 0.01 mL to about 150 mL, preferably from about 3 mL to about 40 mL of a cleaning composition of the invention is combined with from about 2,000 mL to about 20,000 mL, more typically from about 5,000 mL to about 15,000 mL of water in a sink having a volumetric capacity in the range of from about 1,000 mL to about 20,000 mL, more typically from about 5,000 mL to about 15,000 mL. The soiled dishware are immersed in the sink containing the diluted cleaning compositions then obtained, where contacting the soiled surface of the dishware with a cloth, sponge, or similar cleaning implement cleans them. The cloth, sponge, or similar cleaning implement may be immersed in the cleaning composition and water mixture prior to being contacted with the dishware, and is typically contacted with the dishware for a period of time ranged from about 1 to about 10 seconds, although the actual time will vary with each application and user. The contacting of cloth, sponge, or similar cleaning implement to the dishware is preferably accompanied by a concurrent scrubbing of the dishware.

More preferably the neat dishwashing detergent product can also be applied directly on the dishware, or more preferably directly on an optionally but preferably pre-wetted cleaning implement, preferably a pre-wetted sponge. Typically, between 0.1 mL and 25 mL, rather between 1 mL and 10 mL of the dishwashing detergent product is dosed by the consumer on the sponge. This pre-wetted detergent carrying sponge is consequently contacted with optionally pre-wetted dishware to be cleaned. The cleaning action can be performed under a tap of running water such that applied detergent and removed soil can be rinsed off the dishware. Alternatively, the cleaning action can be done without running water, followed by a consequent rinsing step to remove the applied detergent and soil from the dishware.

Another aspect of the present invention is directed to use of a hand dishwashing cleaning composition of the present invention for providing good sudsing profile, including flash suds in a hand dishwashing process and/or for providing stable suds, especially when applied on a cleaning implement, e.g., sponge, upon dilution with wash water during the rinse process. The composition preferably provides the stable suds as having a static yield stress between 9 Pa and 12 Pa at from 10% down to 0.5% product concentration in demineralized water and 20° C., as measured using the method described herein.

Test Methods

The following assays set forth must be used in order that the invention described and claimed herein may be more fully understood.

Test Method 1: Viscosity

The rheology profile is measured using a "Brookfield RVT" viscometer. The neat viscosity is measured at 25° C., spindle 21 and RPM: 20.

Test Method 2: Foam Rheology Test

The foam rheology test aims at measuring physical characteristics of foam, representative for foam consistency and overall consumer acceptability of the foam generated from a detergent composition when applied and agitated on a sponge through manual squeezing action.

When measuring the foam rheology for different product concentrations, the sustainability of foam aesthetics for the product upon dilution with wash water throughout the wash process is also determined. The test is conducted by the following steps:

1. For each test product, 30 g of aqueous wash solutions (15 dH water hardness, 20° C.) of the targeted product concentrations (e.g., 10%, 1%, 0.5%) are prepared.
2. Synthetic dishwashing sponges (Brand: Delhaize Belgium scour sponges with grip —dimensions: length 9.5 cm, width 6.5 cm and height 4.5 cm, item number 17152/0000) are pre-conditioned by washing them without detergent during 3 cycles of 32 mins at 40° C. and 15 dH water hardness in a laundry washing machine (Brand: Miele Softronic W3205—Express cycle).
3. The washed sponges are left to dry for 2 days under a fume food (Brand: Kbtermann type 2-453-GAHB) with air flow 0.64 m/sec under standard lab conditions (e.g., 20-22° C., 40-60% rH).
4. The respective 30 g wash solution is distributed homogeneously over the soft side opposite to the scouring side of the dry sponge, allowing the wash solution to completely submerge into the sponge for 20 seconds.
5. While wearing latex lab gloves and while holding the scouring side down, the sponge is manually squeezed 5 times with maximum power (i.e., frequency 1 squeeze per second) after which the generated foam on the sponge is collected in a cup and transferred with a spatula onto the serrated peltier plate of the rheometer (TA Rheometer DHR1) such that the entire serrated peltier plate surface is covered with foam.
6. The foam rheology is measured with a serrated parallel plate (both top and bottom serrated geometry) at a gap of 1000 μm and following a peak hold procedure at 20° C., at shear rate 1/s with a duration of 300 seconds measuring 600 data points (stress constant=79577.5

Pa/N·m, strain constraint=20 1/rad). The value measured after 1 second is reported as the static yield stress.

7. 3 replicates are run for each test product at each product concentration and the measured static yield stress values are averaged per product and per product concentration. For each product concentration and replicate, a new dry sponge is used and all tests are run by the same expert operator.

The ΔYield Stress between 2 different product concentrations is calculated by subtracting the Static Yield Stress value of the lower product concentration from the Static Yield Stress value of the higher product concentration, according to the formula described below:

ΔYield Stress(X%-Y%)=Static Yield Stress at X% product concentration−Static Yield Stress at Y% product concentration

EXAMPLES

The following examples are provided to further illustrate the present invention and are not to be construed as limitations of the present invention, as many variations of the present invention are possible without departing from its spirit or scope.

Example 1: Cleaning Composition comprising Alkyl Polyglucoside Surfactant and Comparative Compositions The ability of a cleaning composition to maintain its suds aesthetics upon dilution has been assessed for a cleaning composition comprising the alkyl polyglucoside surfactant of the invention (Inventive Composition 1). In parallel, comparative compositions are prepared by replacing the alkyl polyglucoside surfactant of the invention with the following: i) demineralized water (Comparative Composition 1); or ii) a larger alkyl chain alkyl polyglucoside (Comparative Example 2). The foregoing compositions are produced through standard mixing of the components described in Table 1.

TABLE 1

| Inventive and Comparative Compositions | | | |
|---|---|---|---|
| Ingredients (wt % as 100% active) | Inventive Composition 1 | Comparative Composition 1 | Comparative Composition 2 |
| Surfactant | | | |
| C1213AE0.6S (20.96% branching) | 18.66% | 20.13% | 18.66% |
| C1214 alkyl dimethyl amine oxide | 6.22% | 6.71% | 6.22% |
| C1012Alkylpolyglucoside** (APG : Glucopon ® GD70)* | 2% | — | 1% |
| C1214Alkylpolyglucoside*** (APG : Glucopon ® 600CSUP)* | — | — | 1% |
| Solvent | | | |
| ethanol | 1.5% | 1.5% | 2.5% |
| Polypropyleneglycol (MW2000) | 1% | 1.15% | 1% |
| Electrolyte | | | |
| NaCl | 0.8% | 0.8% | 0.8% |
| Na-citrate | — | 0.5% | — |

TABLE 1-continued

| Inventive and Comparative Compositions | | | |
|---|---|---|---|
| Ingredients (wt % as 100% active) | Inventive Composition 1 | Comparative Composition 1 | Comparative Composition 2 |
| Balance | | | |
| Water and minors (dye, perfume, preservative) | To 100% | To 100% | To 100% |
| Physical Properties | | | |
| pH | 8.96 | 9.04 | 8.96 |

*Commercially available from BASF.

**C10C12Alkylpolyglucoside means that the average carbon chain length is in between C10 and C12.

***C12C14Alkylpolyglucoside means that the average carbon chain length is in between C12 and C14.

Example 1a: Foam Rheology Profile of Inventive and Comparative Compositions

The resultant compositions including the Inventive Composition 1 and Comparative Compositions 1-2 are assessed according to the Foam Rheology test method as described herein. The yield stress results of the test are summarized in Table 2. The data clearly shows that a product comprising the APG surfactant according to the invention (Inventive Composition 1) builds the desired foam rheology and is able to sustain it better upon dilution contrary to products outside the scope of the invention not comprising the APG surfactant of the invention (Comparative Composition 1) or a product comprising a longer chain APG surfactant (Comparative Composition 2).

Indeed, as the data shows, the foam rheology of Inventive Composition 1 at a 10% dilution gives a yield stress value within the consumer desired 9 to 12 Pa range, contrary to the Comparative Compositions exceeding the consumer desired yield stress range.

Furthermore, the yield stress value, and hence foam rheology/foam aesthetics, is better sustained upon further dilution for the Inventive Composition 1 versus Comparative Compositions 1 & 2.

TABLE 2

| Static Yield Stress Results/Foam Rheology Performance | | | |
|---|---|---|---|
| | Inventive Composition 1 | Comparative Composition 1 | Comparative Composition 2 |
| Static Yield Stress (Pa) | | | |
| 10% product concentration | 11.21 | 14.07 | 14.60 |
| 1% product concentration | 10.21 | 11.44 | 10.46 |
| 0.5% product concentration | 9.55 | 9.67 | 8.59 |
| Δ Yield Stress (Pa) | | | |
| Δ Yield Stress (10%-1%) | 1.00 | 2.63 | 4.14 |
| Δ Yield Stress (10%-0.5%) | 1.66 | 4.4 | 6.01 |
| Δ Yield Stress (1%-0.5%) | 0.66 | 1.77 | 1.87 |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A hand dishwashing cleaning composition comprising:

a) from about 5% to about 50% of a surfactant system by weight of the hand dishwashing cleaning composition, the surfactant system comprising:

(i) from about 1% to about 20% by weight of the surfactant system of an alkyl polyglucoside surfactant, wherein 100% by weight of the total alkyl pglvgluCoside surfactant in the hand dishwashing cleaning composition has an average alkyl carbon chain length between 10 and 12 and an average degree of polymerization of between 0.1 and 3

(ii) from about 5% to about 40% by weight of the surfactant system of linear or branched alkyl amidopropyl betaine, and (iii) from about 50% to about 85% by weight of the surfactant system of an anionic surfactant which is an alkyl ethoxy sulfate with an average degree of ethoxylation of less than about 5, and an average level of branching of from 5% to about 60%; and b) from about 50% to about 85% by weight of the total composition of water by weight of the hand dishwashing cleaning composition, and wherein the composition produces a foam upon dispensing and the dispensed foam has a static yield stress between about 9 Pa and about 12 Pa at a 10% product concentration in demineralized water and 20° C.

2. The composition according to claim 1, wherein (ii) further comprises an amine oxide surfactant.

3. The composition according to claim 2, wherein the amine oxide surfactant is selected from the group consisting of linear or branched alkyl amine oxide, linear or branched alkyl amidopropyl amine oxide, and mixtures thereof.

4. The composition according to claim 1, wherein the surfactant system comprises:

(i) from about 3% to about 10%, by weight of the surfactant system of the alkyl polyglucoside surfactant;

(ii) from about 15% to about 30%, by weight of the surfactant system of the linear or branched alkyl amidopropyl betaine; and (iii) from about 60% to about 75%, by weight of the surfactant system of the alkyl ethoxy sulfate.

5. The composition according to claim 1 further comprising from about 1% to about 25% by weight of the surfactant system of a non-ionic surfactant.

6. The composition according to claim 5, wherein the non-ionic surfactant is an alkyl ethoxylated non-ionic surfactant comprising on average from about 9 to about 15 carbon atoms in its alkyl chain and on average from about 5 to about 12 units of ethylene oxide per mole of alcohol.

7. The composition according to claim 1, further comprising from about 0.05% to about 2%, by weight of the total composition of an amphiphilic polymer selected from the group consisting of amphiphilic alkoxylated polyalkyleneimine, amphiphilic graft polymer and mixtures thereof.

8. The composition according to claim 7, wherein the amphiphilic alkoxylated polyalkyleneimine is an alkoxylated polyethyleneimine polymer comprising a polyethyleneimine backbone having average molecular weight range from about 100 to about 5,000 Daltons and the alkoxylated polyethyleneimine polymer further comprising:

(i) one or two alkoxylation modifications per nitrogen atom by a polyalkoxylene chain having an average of about 1 to about 50 alkoxy moieties per modification, wherein the terminal alkoxy moiety of the alkoxylation modification is capped with hydrogen, a C1-C4 alkyl or mixtures thereof;

(ii) an addition of one C1-C4 alkyl moiety and one or two alkoxylation modifications per nitrogen atom by a polyalkoxylene chain having an average of about 1 to about 50 alkoxy moieties per modification wherein the terminal alkoxy moiety is capped with hydrogen, a C1-C4 alkyl or mixtures thereof; or (iii) a combination thereof; and wherein the alkoxy moieties comprises ethoxy (EO) and/or propxy (PO) and/or butoxy (BO) and wherein when the alkoxylation modification comprises EO it also comprises PO or BO.

9. The composition according to claim 1 further comprising at least one active selected from the group consisting of: i) from about 0.05% to about 2% by weight of the total composition of a salt selected from the group consisting of a monovalent, divalent inorganic salt or a mixture thereof; ii) from about 1% to about 10% by weight of the total composition of a hydrotrope or a mixture thereof; iii) from about 0.01% to about 25% by weight of the total composition of an organic solvent selected from the group consisting of an alcohol, a polyalkyleneglycol, and mixtures thereof; and iv) mixtures thereof.

10. The composition according to claim 1, wherein the composition has a pH range of from about 6 to about 14 as measured at 10% dilution in distilled water at 20° C.

11. The composition according to claim 1, wherein the composition has a viscosity of from about 10 mPa s to about 10,000 mPa s as measured on a Brookfield RVT Viscometer using spindle 21 at 20 RPM at 25° C.

12. The composition according to claim 1, wherein a weight percentage ratio of the anionic surfactant to the linear or branched alkyl amidopropyl betaine is from about 1:1 to about 8:1.

13. The composition according to claim 1, wherein the composition produces a foam upon dispensing and the dispensed foam having a delta yield stress between 0 Pa and about 2 Pa at a 10% product concentration versus a 1% product concentration in demineralized water and 20° C.

14. A method of manually washing dishware comprising the step of contacting the composition according to claim 1 in undiluted form with the dishware.

15. A method of manually washing dishware comprising the steps of:

i) delivering a composition according to claim 1 onto soiled dishware or a cleaning implement;

ii) cleaning the dishware with the composition in the presence of water; and optionally, rinsing the dishware.

* * * * *